US006081292A

United States Patent [19]

Lanigan, Jr. et al.

[11] Patent Number: 6,081,292

[45] Date of Patent: Jun. 27, 2000

[54] GRAPPLER GUIDANCE SYSTEM FOR A GANTRY CRANE

[75] Inventors: Jack Lanigan, Jr., New Lenox; Daniel J. Olson, Orland Park, both of Ill.

[73] Assignee: Mi-Jack Products, Inc., Hazel Crest, Ill.

[21] Appl. No.: 09/073,331

[22] Filed: May 6, 1998

[51] Int. Cl.[7] ........................ H04N 7/18

[52] U.S. Cl. ........................ 348/61; 414/138.2; 414/138.3; 414/139.6; 114/264; 382/107; 361/189; 434/43; 212/344

[58] Field of Search ........................ 348/95, 94, 86, 348/135, 162, 163, 164, 61; 414/392; 212/276

[56] References Cited

U.S. PATENT DOCUMENTS

| | | | |
|---|---|---|---|
| 2,355,086 | 8/1944 | Lang . | |
| 3,367,299 | 2/1968 | Sayre, Jr. . | |
| 3,858,728 | 1/1975 | Fathauer . | |
| 3,881,608 | 5/1975 | Hupkes . | |
| 3,904,234 | 9/1975 | Hill et al. . | |
| 3,972,420 | 8/1976 | Stock et al. . | |
| 4,139,107 | 2/1979 | Ninomiya et al. | 414/392 |
| 4,151,983 | 5/1979 | Stock et al. . | |
| 4,172,685 | 10/1979 | Nabeshima et al. . | |
| 4,177,964 | 12/1979 | Hujsak et al. . | |
| 4,245,271 | 1/1981 | Gwin | 361/189 |
| 4,260,187 | 4/1981 | Bejczy . | |
| 4,358,145 | 11/1982 | Svensson . | |
| 4,419,079 | 12/1983 | Georges et al. | 434/43 |
| 4,423,998 | 1/1984 | Inaba et al. . | |
| 4,460,302 | 7/1984 | Moreau et al. . | |
| 4,657,728 | 4/1987 | Coppa et al. . | |
| 4,715,772 | 12/1987 | Kanayma . | |
| 4,725,826 | 2/1988 | Hunter . | |
| 4,843,708 | 7/1989 | Yokoi et al. . | |
| 4,884,681 | 12/1989 | Pierre et al. . | |
| 4,932,541 | 6/1990 | Belsterling . | |
| 5,048,703 | 9/1991 | Tax et al. . | |
| 5,067,013 | 11/1991 | Lindhom et al. | 348/94 |
| 5,114,295 | 5/1992 | Jansson . | |
| 5,154,561 | 10/1992 | Lee | 414/138.3 |
| 5,392,935 | 2/1995 | Kazama et al. . | |
| 5,428,344 | 6/1995 | Curry et al. . | |
| 5,481,248 | 1/1996 | Kruh . | |
| 5,491,549 | 2/1996 | Wichner et al. | 356/141.2 |
| 5,649,636 | 7/1997 | Baumann . | |
| 5,754,672 | 5/1998 | Monzen et al. | 382/107 |

FOREIGN PATENT DOCUMENTS

| | | |
|---|---|---|
| 0 254 192 A3 | 1/1988 | European Pat. Off. . |
| 0 342 655 A2 | 11/1989 | European Pat. Off. . |
| 0 342 655 A3 | 11/1989 | European Pat. Off. . |
| 0 347 784 A1 | 12/1989 | European Pat. Off. . |
| 2 053 590 | 10/1970 | Germany . |
| 26 42 373 | 9/1976 | Germany . |
| 27 46 794 | 10/1977 | Germany . |
| 2 099 255 | 12/1982 | United Kingdom . |
| 2 113 179 | 8/1983 | United Kingdom . |

*Primary Examiner*—Chris S. Kelley
*Assistant Examiner*—Shawn S. An
*Attorney, Agent, or Firm*—Leydig, Voit & Mayer

[57] ABSTRACT

In a gantry crane having a movable grappler adapted for lifting standard containers, a system is provided to aid in positioning the grappler relative to the container. The grappler is equipped with at least two corner video devices located near corners of the grappler for viewing the corner locking holes of a container below. In an embodiment, an additional distal video device is mounted to a side of the grappler opposite the cab to view the relative orientation of a side of the container relative to the side of the grappler. In an embodiment, a plurality of alignment sensors are mounted to respective sides of the grappler to detect the relative position of corresponding sides of the container vertically below. In an embodiment, a pair of height sensors are mounted to the grappler to measure a height of the grappler above the upper surface of the container. Additionally, indicators are provided in the cab to indicate information transmitted from the alignment sensors and/or height sensors. A method is provided for guiding the grappler wherein an operator adjusts the grappler position so that a line on a monitor overlaps or corresponds to an edge of the container displayed on the monitor as viewed from one of the video devices.

23 Claims, 5 Drawing Sheets

GRAPPLER GUIDANCE SYSTEM FOR A GANTRY CRANE

BACKGROUND OF THE INVENTION

The present invention generally relates to a system for positioning a grappler relative to a container to be lifted and more particular relates to a system for aiding in the guidance of the grappler so that twistlock mechanisms of the grappler may be precisely aligned with locking holes of a container.

Gantry cranes are conventionally used in railyards, shipping yards, and other places for loading and unloading large containers to and from railcars, trailers, pallets, etc. Such a crane typically has a sturdy steel frame with four vertical columns, upper horizontal beams fixed between the columns, and a lifting mechanism movably mounted to the beams. The lifting mechanism has twistlocks or spreader clamps to lockably engage the container in a standard manner.

The grappler is movably suspended from the frame so that the grappler can be positioned and lowered to engage a container. More specifically, the lifting mechanism generally includes a trolley traversibly mounted on the horizontal beams for side-to-side movement. Also, the grappler is suspended from the trolley by cables or wire ropes or other means. On some cranes, the suspended grappler may be moved forwardly or rearwardly along the trolley as well. Additionally, the hoisting means are operably movable to selectively lift and lower the grappler.

The grappler must be properly positioned and lowered to engage a container to be lifted. Specifically, the grappler must be carefully landed on top of the container while aligning the four grappler twistlocks with the four respective corner-located locking holes in the container.

Properly landing the grappler on a container with precise alignment in this manner has conventionally been difficult. A gantry crane conventionally has a cab which is mounted to the frame and which contains controls for driving the crane and positioning the grappler. Conventionally, the operator controls the grappler by eyesight from a vantage-point through the cab window. Accordingly, the operator has been typically required to maneuver and lower the grappler to land on top of a container with precise positioning.

Such manual "eyeball" positioning can be difficult, especially when the grappler is moved to a distal position relative to the cab. The operator's ability to align the conventional grappler in such a manner requires keen depth perception, concentration and alertness. Extra personnel are sometimes required to stand near the container and provide hand signals to assist the operator. Additionally, changes in lighting and weather conditions may impede an operator's ability to accurately position the grappler.

Various positioning aids have been attempted in the art. For example, U.S. Pat. No. 5,067,013 discloses a crane having two video cameras mounted at opposite corners of a grappler. The cameras are directed downwardly toward a container to be engaged. The video signals from the cameras are displayed on monitors in the cab to assist the crane operator in positioning the grappler.

SUMMARY OF THE INVENTION

The present invention provides an improved grappler positioning system for a gantry crane. In particular, according to the invention, a grappler is provided with a combination of various video devices and position sensors that provide information to aid in guiding the grappler. In an embodiment, the information is displayed on instruments and/or monitors in the cab so that an operator can appropriately manually guide the grappler. In another embodiment, the information may be analyzed by a computer which thereby automatically controls the grappler to an accurately positioned landing on a container.

According to the invention, at least two video devices are mounted to the grappler near respective twistlocks. These video devices are aimed downwardly to view the container below and to assist in guiding the grappler so that the twistlocks are properly received and engaged in correspondingly-positioned corner locking holes in a standard container. In combination with the video devices, the system also includes various distance-measuring sensors. Specifically, the system of the invention includes a pair of ultrasonic distance-measuring sensors which are mounted near longitudinally opposite ends of the grappler, each of the distance-measuring sensors measuring the distance between a point of the grappler and the upper surface of the container. A tilting of the grappler is indicated by a difference between the measured distances.

Additionally, an embodiment of the system further includes a distal video device mounted to a side of the grappler opposite the cab to provide a view of the grappler and container. In an embodiment, this distal video device has a wide angle or "fisheye" lens so that the operator has a broad view of the grappler and container from a perspective opposite his own.

Furthermore, an embodiment of the system includes four ultrasonic edge sensors mounted to respective sides of the grappler to detect the relative positions of respective quadrilateral edges of a container below. When each of the ultrasonic edge sensors detects that it is positioned vertically over the edge of the container, an associated light in the cab is actuated. When all four lights are actuated, the grappler is positioned so that it can be vertically lowered by the hoisting means to land on the container.

An advantage of the invention is that it provides an improved grappler positioning system for a gantry crane.

Another advantage of the invention is that it aids an operator in guiding a grappler to a container to be lifted.

A further advantage of the invention is that it provides a combination of helpful information which is displayed to an operator, including video pictures and other information indicating grappler distance and position.

Yet another advantage of the invention is that it provides guidance assistance by sensing the location of edges of a container relative to the grappler.

A still further advantage of the invention is that it increases safety in a loading environment. For example, the invention eliminates a need for extra personnel to stand near the loading activity and provide guidance signals to the operator, such as signals by hand, voice, radio, light, etc.

An additional advantage of the invention is that provides a system which increases container-handling efficiency of a gantry crane.

Additional features and advantages of the present invention are described in, and will be apparent from, the description of the invention herein, the claims, and the drawings.

DETAILED DESCRIPTION OF THE DRAWINGS

Figure 1:
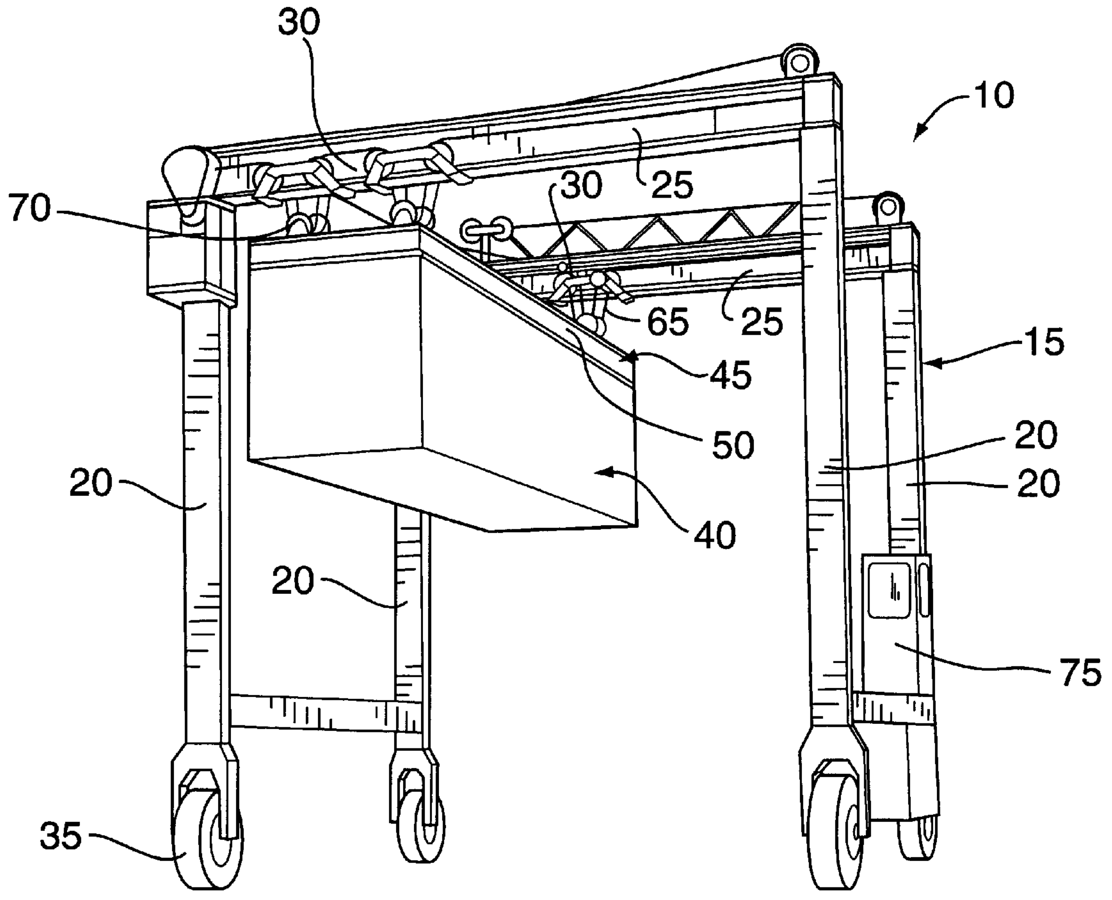
FIG. 1 is a perspective view of a gantry crane constructed in accordance with teachings of the present invention.

Now turning to the Figures, wherein like numerals designate like components, FIG. 1 illustrates a mobile gantry crane 10 having a grappler positioning system according to the invention. Generally, the crane 10 has a frame 15 including four vertical columns 20, upper horizontal beams 25 fixed between the columns 20, and a pair of trolleys 30 movably mounted to the respective beams 25 for transverse movement. The crane 10 includes a plurality of wheels 35 on which the crane 10 is rollably drivable.

For lockably engaging and lifting a container 40, the crane 10 has a lifting mechanism or grappler 45 which is movably suspended from the trolleys 30. The grappler 45 generally includes a body 50 having a container-grasping mechanism, such as four male twistlocks 55 (FIGS. 2, 3) mounted in a rectangular pattern corresponding to positions of locking holes 60 (FIG. 2) located at the top corners of a standard shipping container 40. The twistlocks 55 enable the grappler 45 to lockably engage a container 40 for lifting, as described in greater detail below. Although the body 50 of the grappler 45 is illustrated in FIG. 1 as being rectangular, the body 50 can of any suitable shape such that the twistlocks 55 are at the desired relative positions. The grappler 45 is generally aligned along a longitudinal axis which extends from front to back of the crane 10.

In other possible embodiments, the grappler 45 may have grappler arms (not shown) of a type which are generally known. When the grappler 45 is properly landed and/or aligned on a container, the grappler arms are pivoted to grab the container for lifting. Such arms may be provided in addition to, or in lieu of, the twistlocks 55.

In an embodiment illustrated in FIG. 1, the grappler 45 is suspended from the trolleys 30 by wire ropes 65. On the wire ropes 65, the grappler 45 is selectively lifted and lowered. The wire ropes 65 are coilably paid out and retracted from rotatable hoisting drums mounted to the respective trolleys 30. These wire ropes 65 pass around rotatable sheaves 70 fixed to the grappler 45. When the wire ropes 65 are moved, the suspended grappler 45 is caused to move vertically lower or higher. In another embodiment (not illustrated), the grappler 45 is fixed to the trolleys 30, and the beams 25 are movably mounted to engage tracks extending along the columns 20. The grappler 45 is vertically movable by operably driving the beams 25 along the columns 20.

The trolleys 30 are movable in a side-to-side manner, moving the suspended grappler 45 accordingly. The trolleys 30 include rollers to facilitate traversible travel of the trolleys 30 along the respective horizontal beams 25 of the frame 10. In an embodiment, the suspended grappler 45 may be movably mounted for forward or rearward movement along a longitudinal beam extending between the trolleys 30 as well.

Still referring to FIG. 1, the gantry crane 10 includes a cab 75 mounted to the frame 15 to accommodate an operator. The cab 75 contains controls for driving the crane 10 and positioning the grappler 45. The operator can view the grappler and container to be lifted through windows in the cab 75.

The grappler 45 must be properly positioned and lowered to engage a container 40 to be lifted. Specifically, the grappler 45 must be carefully landed on an upper surface 41 of the container 40 in corresponding alignment. For example, in the embodiment of FIGS. 2 and 3, the grappler must be lowered while the four twistlocks 55 are respectively aligned with the locking holes 60 located in the top of the container 40. When the grappler 45 is lowered in proper alignment onto the top of the container 40, the twistlocks 55 are matably received into the locking holes 60. The twistlocks 55 are then actuated to rotate within the holes 60, lockably securing the grappler 45 to the container 40 in a generally known manner for lifting and handling.

According to the invention, a grappler positioning system is provided to assist in positioning a grappler as it is lowered to engage a container. The system includes video devices in combination with position sensors that provide information to assist in properly guiding the grappler relative to the container.

Figure 2:
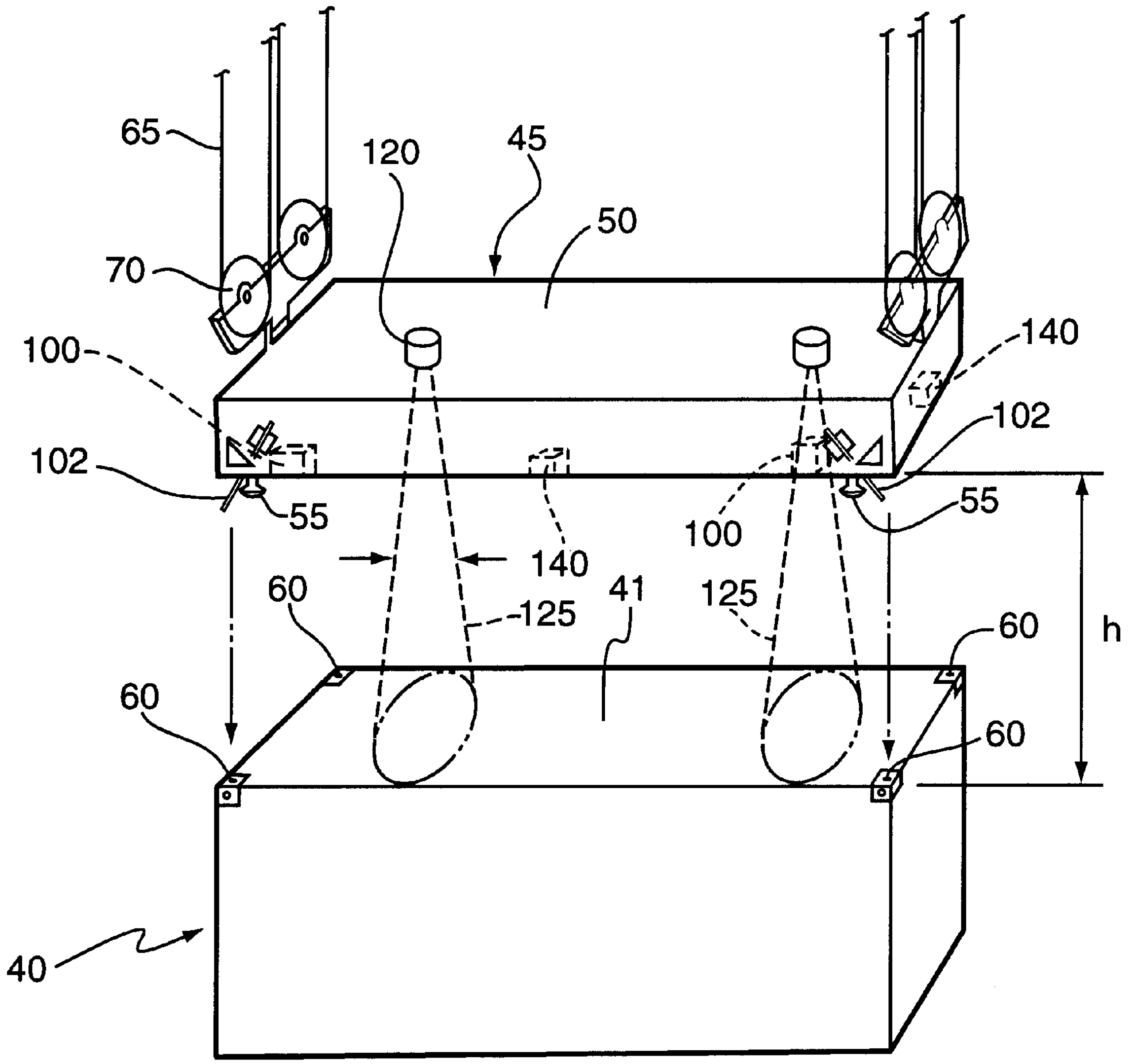
FIG. 2 is a schematic perspective view of the grappler of the crane of FIG. 1.
Figure 3:
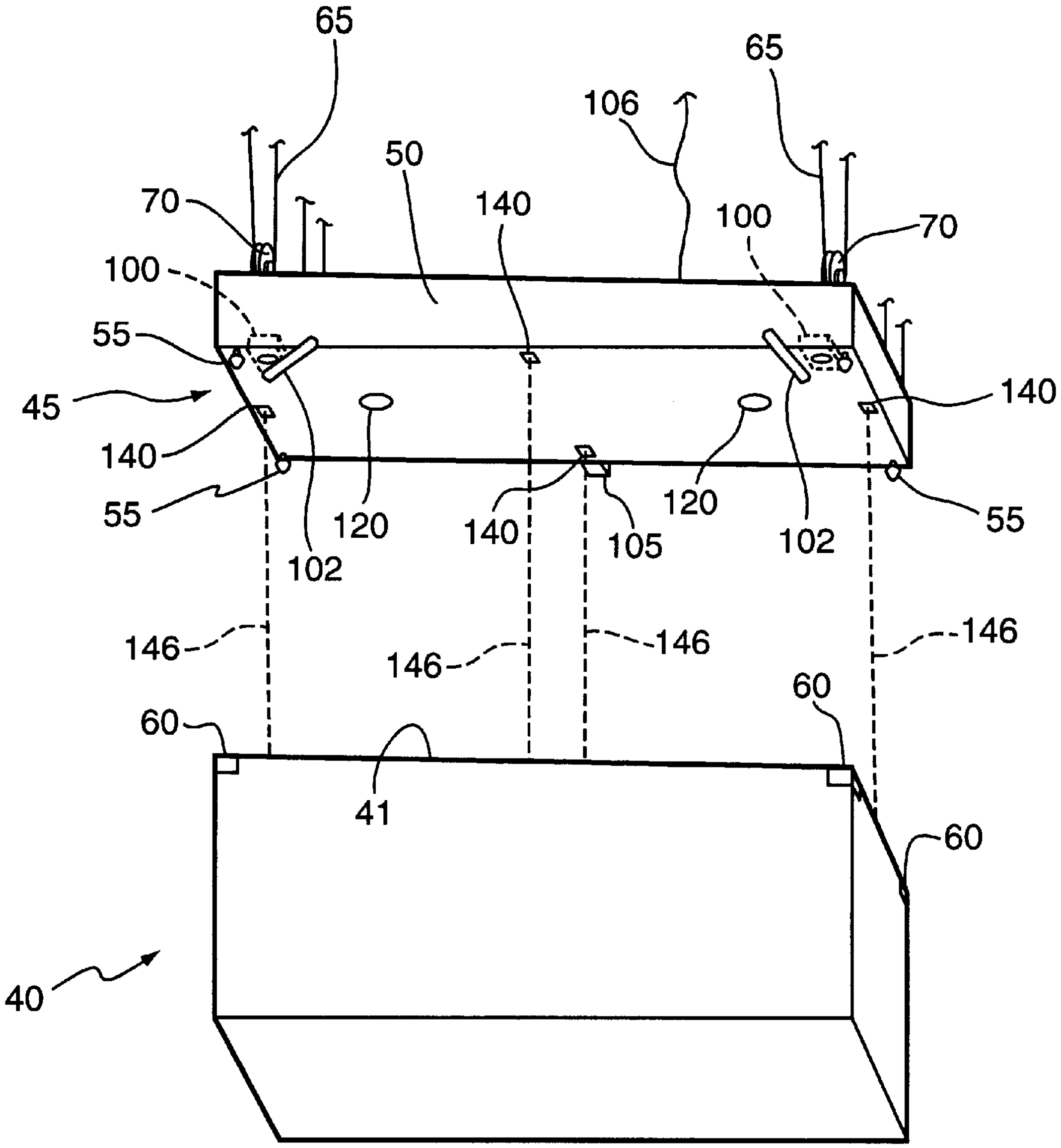
FIG. 3 is a schematic perspective view of the grappler of the crane of FIG. 1.

In particular, referring to FIGS. 2 and 3, at least two corner video devices 100 are mounted to the grappler 45 at respective corners of the grappler body 50. More specifically, in the embodiment shown in FIGS. 2 and 3, the video devices 100 are respectively mounted near at least two of the twistlocks 55. These video devices 100 are aimed generally downwardly to view the container 40 below, and particularly to view respective corner areas of the container 40 having the locking holes 60 disposed therein. The video devices 100 deliver images which are displayed in the cab 75.

The image provided by each video device 100 enables the operator to adjust the side-to-side or front-to-back position of the grappler 45 relative to the container 40 as the grappler 45 is lowered to properly align the respective twistlocks 55 with the corresponding locking holes 60. By providing at least two of the corner video devices 100, the operator is able to align two corners of the grappler 45 relative to the container 40, thereby also aligning corners of the grappler not equipped with video devices 100. Embodiments are possible, however, wherein more than two corners of the grappler 45 are equipped with video devices 100.

In an embodiment of the invention, as illustrated in FIGS. 2–3, a pointer 102 is mounted to the grappler body 50 near a respective one of the video devices 100. The pointer 102 is an elongated member which extends downwardly. At least a tip portion of the pointer 102 is viewable by one of said video devices 100 to provide a point of reference of the location of an edge of the grappler 45. As the grappler 45 is maneuvered relative to a container 40, the position of the pointer 102 helps an operator gauge the position of the grappler 45. In the illustrated embodiment, the pointer 102 is disposed along the side of the container when the grappler is lowered to land on top of the container. The pointer 102 may be pivotably mounted and/or constructed of a resilient material so that the pointer 102 is not damaged if brought into contact against the container 40.

In an embodiment of the invention, as illustrated in FIG. 3, a distal video device 105 is mounted to a side of the grappler 45 opposite the cab 75 to provide a downward view of the container 40. In an embodiment, this distal video device 105 has a wide angle or "fisheye" lens. The distal video device 105 provides a view which assists the operator to align the side of the grappler 45 with the side of the container 40.

Figure 4:
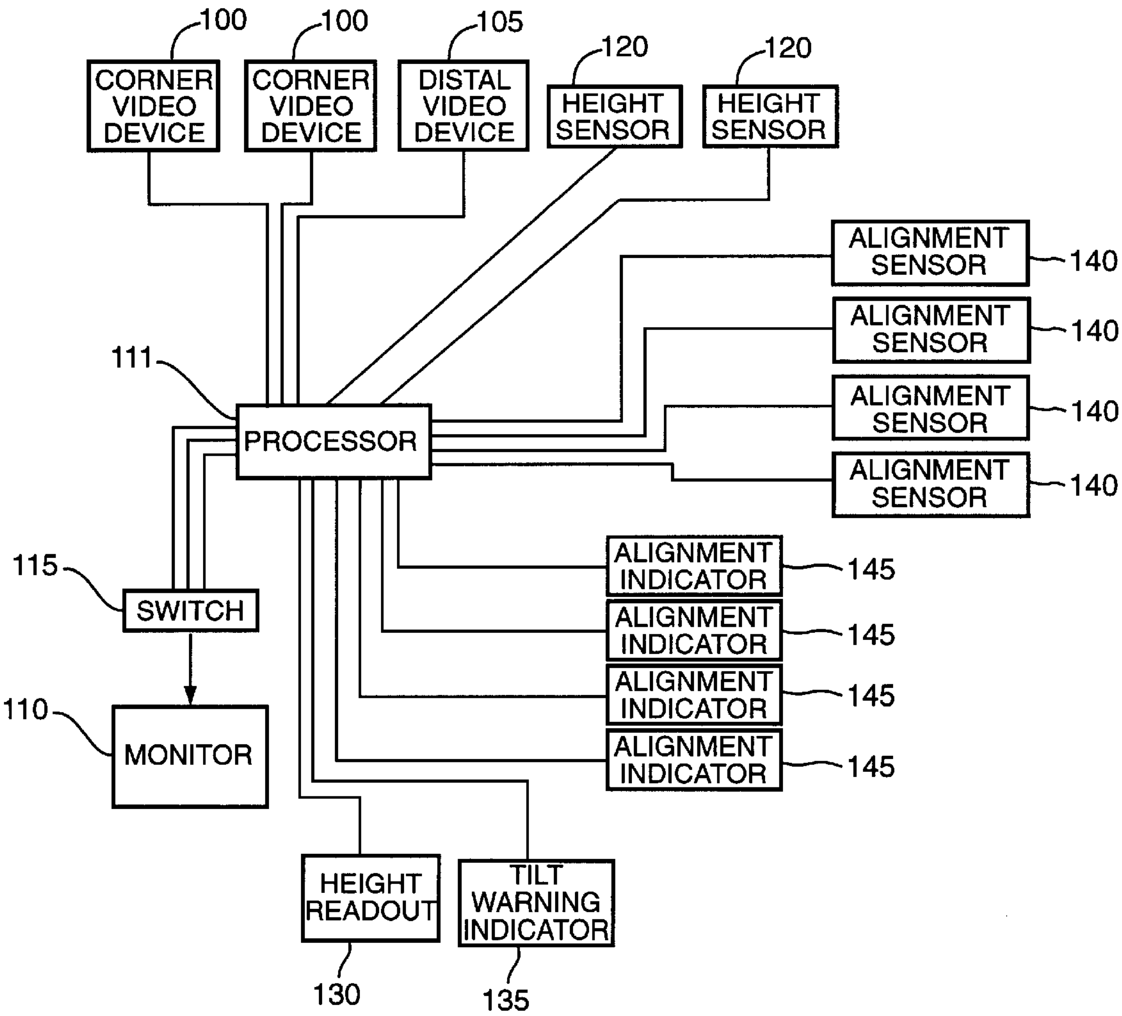
FIG. 4 is a schematic view of a grappler positioning system according to teachings of the invention.

Each of the video devices 100, 105 delivers a video signal via a cable 106 (FIG. 3) which is displayed in the cab 75 on one or more monitors 110, as illustrated in FIG. 4. Signals from the video devices 100, 105 are delivered to a processor 111, which delivers a signal to the monitor 110, which may be a CRT, LCD screen, or some other known type of display. In an embodiment, a single monitor 110 is operable display the view from a selected one of the video devices 100, 105, and a switch 115 is provided to permit selection between the various video devices 100, 105. In another embodiment, multiple video monitors 110 are provided, displaying views from the respective video devices 100, 105. In a still further embodiment, a monitor 110 can have a split display to show images from of a plurality of the video devices 100, 105.

Figure 5:
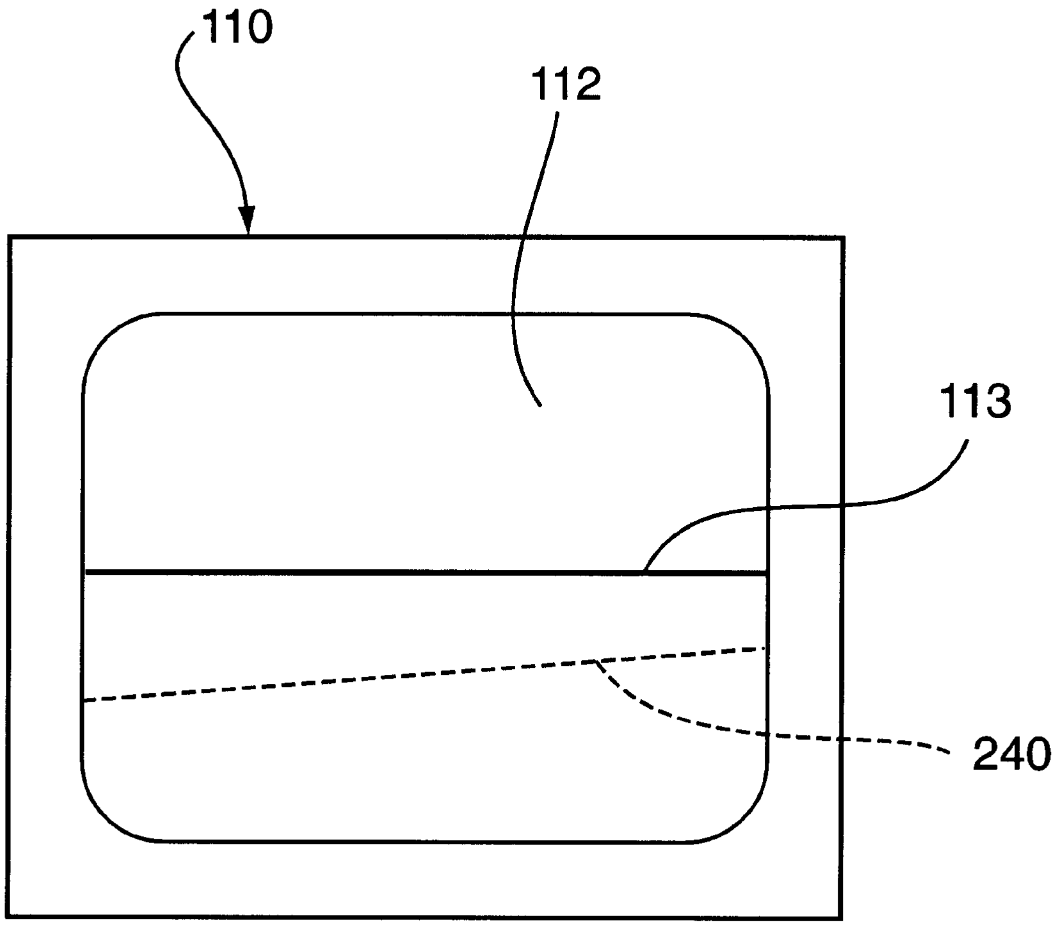
FIG. 5 is a front view of a monitor having a line on the screen providing a reference for the grappler position relative to an edge of a container displayed on the monitor.

In the embodiment which includes the distal video device 105, the monitor 110 may be adapted to indicate a visual reference of the position of the grappler relative to the container 40. More specifically, illustrated in FIG. 5 is the monitor 110 displaying the view from the distal video device 105 (FIG. 3) directed downwardly from the grappler 45. The monitor 110 has a screen 112 across which has a line 113 is provided. The line 113 is to represents an orientation of the side of the grappler 45. As illustrated in FIG. 5, an edge 240 of the container 40 is displayed on the screen 112 as viewed from the distal video device 105. The line 113 is positioned on the screen 112 such that when the line 113 overlies or otherwise corresponds to the image of the edge 240 of the container 40, the grappler 45 is properly oriented with the edge 240 of the container 40. The line 113 can be generated electronically and displayed as an overlay on the screen 112, or the line 113 can be physically applied to the screen 112, such as by tape. With the monitor 110 of the embodiment shown in FIG. 5, an operator can detect the position the grappler 45 relative to the displayed edge 240 container 40 and accordingly adjust the position of the grappler to align the line 113 with the edge 240. The foregoing procedure can also be used to align the grappler 45 with a trailer for typical bottom picking applications with the grappler arms (not shown).

Also illustrated in FIGS. 2 and 3, for measuring a distance h between the grappler 45 and an upper surface 42 of the container 40, an embodiment of the invention further includes at least two height sensors 120 are mounted to the grappler 45. The height sensors 120 are spaced from each other so that a tilting of the grappler 45 can be detected by a difference in the heights measured by the respective height sensors 120. Particularly, in an embodiment, a pair of height sensors 120 is mounted to an underside of the grappler 45 such that the sensors 120 are spaced from each other in a longitudinal direction.

Preferably, the height sensors 120 operate by with ultrasonic waves. As illustrated in FIG. 2, each of the height sensors 120 emits ultrasonic waves 125 which are reflected from the upper surface 42 of the container 40. By detecting the time for the reflected waves to return to the sensor, a generally downward distance h is measured between a respective one of the height sensors 120 and the upper surface 41 of the container 40. A distance measurement corresponding to each of the sensors 120 is displayed on a readout 130 in the cab 75, as shown in FIG. 4.

In an embodiment, the processor 111 detects when the height sensors 120 are measuring substantially different respective heights, assuming a tilted orientation of the grappler 45 relative to the container 40. The processor 111 then actuates a warning indicator 135 to alert the operator to the tilted condition or to display the degree of tilt.

In a further embodiment, the system includes a plurality of alignment sensors 140 mounted to respective sides of the grappler 45, as shown in FIGS. 2 and 3. Each of the alignment sensors is operable to detect the relative positions of a corresponding edge of the container 40 below. Preferably, the system includes four alignment sensors 140 mounted at the four respective sides of the grappler 45. The sensors 140 are connected to actuate respective indicators in the cab 75 for example, lights 145 as shown in FIG. 4, when the sides of the grappler 45 are properly aligned vertically above the corresponding sides of the container 40. When the lights 145 indicate that the grappler 45 is aligned vertically above the container 40, as indicated by the dashed lines 146 in FIG. 3, the operator can simply lower the grappler 45 to a properly aligned landing atop the container 40.

The video devices 100 and/or 105 are preferably video cameras which produce a real-time image. Alternatively, the video devices 100 and/or 105 may be some other sort of image generating device such as infrared cameras or appropriate image-mapping transducers.

In an embodiment, the grappler positioning system of the invention may be automated so that the grappler 45 is automatically guided and lowered in proper alignment for engaging the container 40. In such an embodiment, the processor 111 is programmed determine the position of the grappler 45 relative to the container 40 from the signals delivered from the video devices 100, 105 and/or sensors 120, 140. Furthermore, the processor 111 then controllably adjusts the position of trolleys 30 and the motion of the hoist means to carefully lower the grappler 45 relative to a container 40 with proper alignment of the twistlocks 55.

Although the invention is described herein in connection with certain preferred embodiments, it is recognized that various changes and modifications to the invention will be apparent to those skilled in the art. Such changes and modifications may be made without departing from the spirit and scope of the invention. Accordingly, the appended claims are intended to cover all such changes and modifications.

What is claimed is:

1. A gantry crane having frame and a vertically movable grappler supported by the frame, the grappler being operable to engage and lift a container, the grappler having a plurality of twistlocks positioned to engage locking holes in a container, the gantry crane also having a grappler positioning system including:

at least two video devices mounted to the grappler at respective corners of the grappler near the twistlocks;

at least one monitor operable to display a video image from at least one of the video devices;

a plurality of alignment sensors, each alignment sensor being mounted near a respective side of the grappler between two of the twistlocks for sensing a relative position of a respective side of a container vertically below; and an indicator actuatable by a respective one of the alignment sensors to indicate when the respective side of the grappler is aligned vertically over the side of the container.

2. A crane according to claim 1, wherein the alignment sensors are ultrasonic sensors.

3. A crane according to claim 1, further comprising a switch operable to selectively display a view from one of said video devices on said video monitor.

4. A crane according to claim 1, wherein at least one of said video devices is a video camera.

5. A crane according to claim 1, wherein at least one of said video devices is an infrared camera.

6. A crane according to claim 1, further comprising a plurality of height sensors mounted to the grappler sensing respective distances of the grappler from an upper surface of the container and a height display located in the cab displaying a height detected by the height sensors.

7. A crane according to claim 6, wherein the height sensors are ultrasonic sensors.

8. A crane according to claim 1, further comprising a distal video device mounted to a side of the grappler opposite the cab and directed generally downwardly to provide a view of the grappler and container.

9. A crane according to claim 8, wherein the distal video device has a wide angle lens.

10. A crane according to claim 8 wherein the distal video device is mounted to the grappler generally at a midpoint in a longitudinal direction between the corners of the grappler.

11. A crane according to claim 1, further comprising a pointer mounted to extend generally downwardly from the grappler so that a portion of the pointer is viewable by one of said video devices.

12. A grappler guidance system for a gantry crane of a type having a frame supporting a vertically movable grappler which is operable to grasp and lift a container, the grappler having a plurality of twistlocks positioned to engage locking holes at upper corners of a standard container, the gantry crane further having a grappler positioning system including:

at least two corner video devices mounted to the grappler at near respective twistlocks;

a distal video device mounted to a side of the grappler opposite the cab and directed generally downwardly to provide a view of an edge of the container;

at least one monitor operable to display a video image from at least one of the video devices;

a plurality of alignment sensors, each alignment sensor being mounted near a respective side of the grappler between two of the twistlocks for sensing a position of a respective side of a container vertically below relative to the side of the grappler;

an indicator actuatable by a respective one of the alignment sensors to indicate when the respective side of the grappler is aligned vertically over the side of the container a plurality of height sensors mounted to the grappler, each of the height sensors sensing a respective distance between the grappler and an upper surface of the container; and a readout located in the cab displaying a height detected by the height sensors.

13. A grappler guidance system according to claim 12, wherein the alignment sensors are ultrasonic sensors.

14. A grappler guidance system according to claim 12, further comprising a switch operable to selectively display a view from one of said video devices on said video monitor.

15. A grappler guidance system according to claim 12, wherein at least one of said video devices is a video camera.

16. A grappler guidance system according to claim 12, wherein at least one of said video devices is an infrared camera.

17. A grappler guidance system according to claim 12, wherein the height sensors are ultrasonic sensors.

18. A grappler guidance system according to claim 12, wherein the distal video device has a wide angle lens.

19. A grappler guidance system according to claim 12, wherein the distal video device is mounted to the grappler generally at a midpoint in a longitudinal direction between the corners of the grappler.

20. A grappler guidance system according to claim 12, wherein the height sensors are located generally near opposite longitudinal ends of the grappler.

21. A grappler guidance system according to claim 12, further comprising a pointer mounted to extend from the grappler so that a portion of the pointer is viewable by one of said video devices.

22. A crane according to claim 1, wherein said monitor includes a screen for displaying said video image and a line extending across the screen at a position representing an orientation of the grappler such that the grappler is aligned when said line corresponds to an edge of the container as displayed on the screen.

23. A grappler guidance system according to claim 12, wherein said monitor includes a screen for displaying said video image and a line extending across the screen at a position representing an orientation of the grappler such that the grappler is aligned when said line corresponds to an edge of the container as displayed on the screen.

* * * * *